United States Patent

[11] 3,583,450

| [72] | Inventor | Robert J. Gunnerman |
| | | Piqua, Ohio |
| [21] | Appl. No. | 803,872 |
| [22] | Filed | Mar. 3, 1969 |
| [45] | Patented | June 8, 1971 |
| [73] | Assignee | Hartzell Industries, Inc. |
| | | Piqua, Ohio |

[54] SAW SPLITTER AND TIPPER ASSEMBLY
9 Claims, 4 Drawing Figs.

[52] U.S. Cl. .................................................. 143/157,
83/105, 143/159, 144/312
[51] Int. Cl. .................................................. B27b 5/28
[50] Field of Search .......................................... 143/157,
157.4, 157.5, 157.6, 159.15, 159.17, 124;
144/312; 83/102, 105, 109

[56] References Cited
UNITED STATES PATENTS

| 421,861 | 1890 | French .................... | 143/159 |
| 693,630 | 1902 | Thomas .................... | 143/157UX |
| 1,112,727 | 1914 | Smith ...................... | 143/157UX |
| 1,324,325 | 1919 | Stauber .................... | 143/157 |

FOREIGN PATENTS

| 111,170 | 0/1925 | Switzerland ............... | 143/157 |

Primary Examiner—Andrew R. Juhasz
Assistant Examiner—James F. Coan
Attorney—Dybvig & Dybvig ABSTRACT: Cut boards are tipped away from a saw blade and an adjacent splitter by spring members which apply a maximum tipping force to the upper portion of the cut boards. Tipping of the board away from the saw blade is further assured by an abutment which is struck by the cut board as it falls.

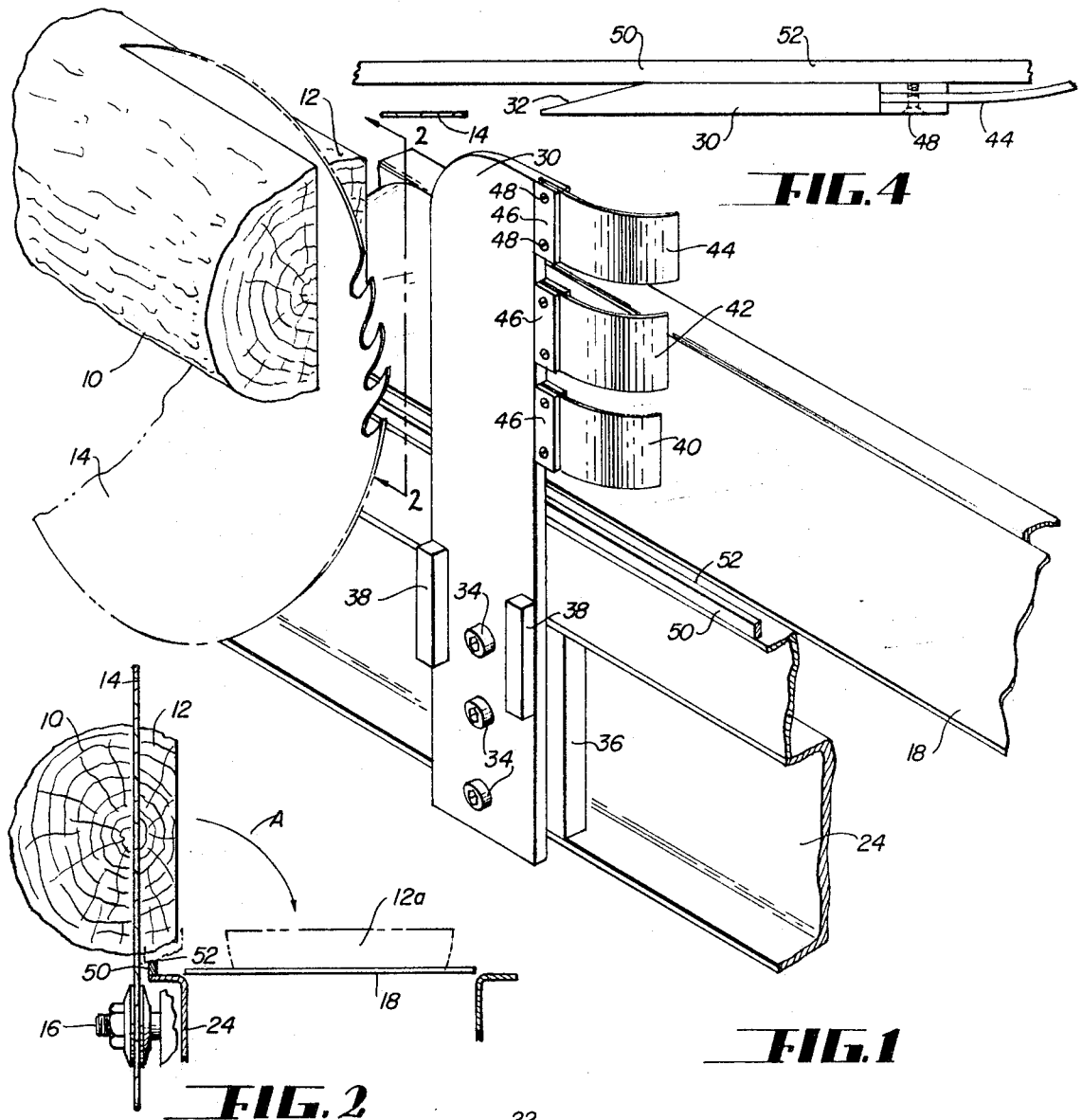
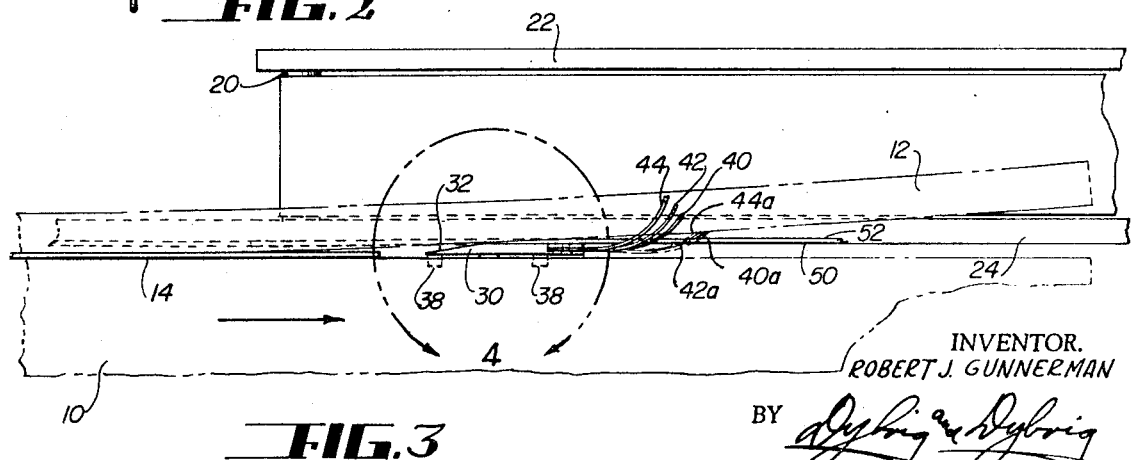

SAW SPLITTER AND TIPPER ASSEMBLY

This invention relates to a saw splitter and tipper assembly for use in sawmills for cutting boards from lumber.

There is a danger when cutting a board that it may not properly fall away from the saw blade but rather may tip back into the saw blade. This condition may result in damage to the cut board and, more importantly, is a potentially hazardous condition because a workman must reach in toward the saw blade to remove the board. Hinged plates have been mounted on saw splitters to push cut boards away from the saw with some success. A hinged plate, however, does not necessarily prevent cut boards from tipping back against the saw blade.

It is an object of this invention to provide a saw splitter and tipper assembly which functions not only to push cut boards away from the associated saw blade but also to tip the cut boards in such a way that they invariably fall away from, rather than toward, the saw blade. In accordance with this invention, spring members are mounted on the edge of a saw splitter remote from the saw blade with portions of the spring members lying in the path of the partially cut boards. The spring members are so positioned that they are cammed out of the path of the boards by the boards themselves until the boards are fully cut. When a board is fully cut, the spring members push it from the saw blade. The uppermost spring member exerts the greatest force against the boards whereby the boards are caused to tip or pivot about their support away from the saw blade. Two spring members might be adequate but three or even more are preferably mounted in vertical alignment on the saw splitter for handling different board widths.

The force exerted by the spring members may not be sufficient to cause the proper tipping of very large boards or planks. Accordingly, another object of this invention is to provide an abutment having an edge over which the board tips or pivots as it falls. The edge of the abutment is so positioned that a board striking it tends to tip safely away from the saw blade. As will be described in detail, the abutment may comprise a narrow bar or slat positioned close to and generally parallel to the plane of the saw blade.

Other objects and advantages will become apparent from the following description and the drawings in which:

FIG. 1 is a perspective view of the saw splitter and tipper assembly shown aligned with a saw blade, a board being cut from a log, and a portion of a conveyor upon which a board, when cut, is to be positioned;

FIG. 2 is an end elevational with parts in section, as viewed in the direction of arrows 2-2 of FIG. 1, of the saw blade, the log and the conveyor belt;

FIG. 3 is a plan view of the apparatus of FIG. 1 with a portion of the log and the board being cut therefrom shown in phantom lines, the cutting of the board having progressed further than illustrated in FIG. 1; and FIG. 4 is an enlarged plan view of that portion of the apparatus enclosed within the circle 4 of FIG. 3.

In FIGS. 1 and 2, a log 10 is shown from which a board 12 is being cut by a circular saw blade 14. The mounting of the saw blade 14 and the mechanism for handling the log 10 are not important to this invention but the saw blade 14 is shown mounted on an axle 16 which, it will be understood, is power driven in any suitable fashion. The log 10 may be grasped by dogging devices (not shown) which automatically cause the log to traverse along the saw blade 14, and after each board is cut therefrom, the log 10 is automatically advanced toward the vertical plane of the saw blade 14 by the thickness of the boards to be cut.

These cut boards may be accumulated in a pile beside the saw or may, as illustrated in the drawing, be moved onto a conveyor belt, designated 18, and moved by the conveyor belt to other locations for subsequent handling. The conveyor belt 18 is shown conventionally mounted upon a roller 20 at one end thereof which in turn is journaled in support frame members 22 and 24. The support or frame member 24 which lies immediately adjacent the saw blade 14 and generally parallel thereto may serve as a saw blade shield or saw husk.

This invention is concerned with appropriately moving cut boards 12 away from the saw blade 14 so that they may either be accumulated in a pile beside the saw or properly positioned on the conveyor belt as indicated by the phantom lines 12a in FIG. 2. Immediately beyond the saw blade 14 and generally in the same vertical plane thereof is a saw splitter 30 which consists of a vertically extending blade having a width on the order of the width of the saw cut between the cut board 12 and the log 10. The function of the saw splitter 30 is to prevent a partially cut board 12 from pinching the saw blade 14. As shown in FIGS. 2 and 4, the splitter 30 may have a sloping rearward edge, designated 32, confronting the saw blade 14 for camming the partially cut board 12 away from the uncut portion of the log 10. The saw splitter 30 is shown connected as by bolts 34 to a support plate 36 welded to the support or frame member 24. Because it is relatively thin, the saw splitter 30 may be provided with stiffening ribs 38 below the level of the log 10 being cut. FIG. 3 illustrates in a somewhat exaggerated fashion the manner in which the saw splitter 30 is aligned with the path of the saw cut to keep the partially cut board 12 away from the uncut portion of the log 10.

The board tipper assembly in accordance with this invention comprises a plurality of curved spring plates 40, 42 and 44 fastened in vertically spaced and aligned relation to the edge or end face of the saw splitter 30 remote from the saw blade 14. For this purpose, the plates 40, 42 and 44 are sandwiched between forwardly extending bifurcated plates or flanges 46 mounted on the aforementioned end face of the saw splitter 30, the plates 46 having apertures aligned with apertures in the spring plates 40, 42 and 44 for receiving mounting screws 48. As shown best in FIG. 4, the screws 48 are countersunk so that the planar face of the splitter 30 engaged by the uncut portion of the log 10 is unbroken.

The spring plates 40, 42 and 44 are prestressed to have an undeformed or natural position, arcuately extending from the end face of the saw splitter 30 into the path of the partially cut boards 12. The plates 40, 42 and 44 are sufficiently flexible that the portions thereof projecting into the path of the partially cut board 12 yield to deformed positions generally aligned with the saw blade 14 and the splitter 30. The deformed positions of the spring plates are indicated in phantom lines at 40a, 42a and 44a in FIG. 3. When a board 12 is fully cut the restoring force stored in the spring plates 40, 42 and 44 is such that they tend to return to the full line, undeformed positions thereof shown in FIG. 3 from the deformed positions thereof. During this return movement, they engage and exert a horizontally directed force to the fully cut board 12 tending to move it horizontally away from the saw blade 14.

To safely pivot or tip the cut board away from the saw blade 14 in the manner indicated by the arrow A in FIG. 2, the spring plates 40, 42 and 44 are constructed to apply the greatest horizontally directed force to the vertically uppermost portion of the board and the least horizontally directed force to the vertically lowermost portion of the board. Thus, the spring plates 40, 42 and 44 are constructed from essentially identical flat rectangular pieces of a suitable metal, such as saw metal, and prestressed with different curvatures. The lowermost spring plate 40 has the greatest radius of curvature and the uppermost spring plate 44 has the least radius of curvature. When the partially cut board 12 cams the spring plates to the phantom line positions thereof shown in FIG. 3, the greatest restoring force is stored in the upper spring plate 44 and the least restoring force is stored in the lower spring plate 40. When the board 12 is thereafter fully cut away from its log 10, the spring plate 44 will apply the greatest horizontally directed force to the upper part of the board 12 causing it to tip away from the saw blade 14 so that, as it falls, the freshly cut side of the board 12 will be upright as indicated by the phantom lines 12a in FIG. 2. From the foregoing it should be apparent that only the two lower spring plates 40 and 42 would be required for smaller diameter logs. The three spring plates 40, 42 and 44 are preferred for handling boards cut from logs of various different sizes.

The saw splitter and tipper assembly as thus far described will automatically tip and move most cut boards horizontally away from the saw blade 14 when fully cut. However, the spring plates 40, 42 and 44 may not, alone, be sufficient to prevent quite heavy or thick boards from tipping back into the saw blade 14. Therefore, an abutment means is provided in accordance with this invention which additionally assures that the cut boards 12 will fall away from the saw blade 14. This abutment means can be simply and inexpensively provided by mounting an elongate, narrow bar or slat 50 on top of the support or frame member 24 in parallel relation to, and immediately adjacent, the saw blade 14. The bar or slat 50 may, for example, be made from one-half inch by 1 inch key stock which extends for 3 or more feet beyond the saw blade 14. It is mounted along the margin of the support or frame member 24 closest to the saw blade 14 in abutting relation to the saw splitter 30. The upper surface of the bar or slat 50 is narrower than the width of the heavier boards 12 to be cut and is sufficiently close to the saw blade 14 that the uppermost edge thereof, designated 52, most remote from the saw blade 14 is in the path of fall of a freshly cut board and closer to the saw blade 14 than is the vertical centerline of the falling board. Accordingly, when a board 12 beings to fall after fully cut, it will tend to pivot about the edge 52 away from the saw blade 14. The use of the narrow bar or slat 50 with the spring plates 40, 42 and 44 causes all cut boards 12 to fall away from the saw blade 14.

Having thus described my invention, I claim:

1. For use with a saw splitter of the type aligned with a saw blade and in the path of the saw cut between a board and a log from which the board is cut, a tipper mechanism including a pair of vertically spaced spring members connected to said saw splitter, said spring members comprising plates connected to the surface of said saw splitter remote from the saw used to cut the log into boards, said plates each being prestressed into an arcuate configuration, the arc of the lower of said plates having the greatest radius of curvature and the arc of the upper of said spring plates having the smallest radius of curvature, said spring members, when undeformed, projecting into the path of a board being cut and yielding in a horizontal direction into deformed positions as a partially cut board moves therepast, the upper of said spring members, when in its deformed position, having a greater restoring force stored therein than the lower of said spring members whereby said spring members exert unequal horizontally directed forces upon the board after it is fully cut with the greatest force being applied to the upper portion of the board.

2. The apparatus of claim 1 further including a third spring member aligned in vertical relation with said pair of spring members, said third spring member, when deformed, having a restoring force stored therein intermediate the restoring forces of said upper and lower spring members.

3. The apparatus of claim 2 wherein said third spring member comprises a third plate connected to the surface of said saw splitter between said upper and lower plates and remote from the saw used to cut the log into boards, said third plate being prestressed into an arcuate configuration, the radius of curvature of said third plate being intermediate the radii of curvature of said upper and lower plates.

4. For use with a saw splitter of the type aligned with a saw blade and in the path of the saw cut between a board and a log from which the board is cut, said saw splitter being mounted upon a support member and the upper surface of said support member having a narrow bar thereon extending parallel to the plane of the saw blade and generally parallel to said saw splitter, said narrow bar having an upper support surface which is narrower than the width of the boards to be cut, a tipper mechanism including a pair of vertically spaced spring members connected to said saw splitter, said spring members, when undeformed, including portions projecting into the path of a board being cut which yield in a horizontal direction into deformed positions as a partially cut board moves therepast, the upper of said spring members, when in its deformed position, having a greater restoring force stored therein than the lower of said spring members whereby said spring members exert unequal horizontally directed forces upon the board after it is fully cut with the greatest force being applied to the upper portion of the board.

5. A saw splitter and tipper assembly for use with a saw blade used for cutting boards from logs comprising a support member, a vertically extending splitter blade mounted on said support member in alignment with the saw blade and in the path of the saw cut formed between a log and a board being cut therefrom, a plurality of vertically spaced spring members mounted on said splitter blade and extending from the end face thereof remote from the saw blade into the path of a board being cut from a log by the saw blade, said spring members comprising plates having different radii of curvature with one end of each of said plates connected to said end face of said splitter blade, said spring members having a restoring force exerted upon a fully cut board and said spring members being constructed to exert a maximum force to the upper part of a fully cut board whereby a fully cut board is horizontally moved and tipped away from the splitter blade and the saw blade.

6. A saw splitter and tipper assembly for use with a saw blade used for cutting boards from logs comprising a support member, a narrow bar mounted on said support member in generally parallel relation to the saw blade and adjacent said saw splitter, the uppermost edge of said narrow bar remote from said saw blade being in the path of fall of a freshly cut board, a vertically extending splitter blade mounted on said support member in alignment with the saw blade and in the path of the saw cut formed between a log and a board being cut therefrom, a plurality of vertically spaced spring members mounted on said splitter blade and extending from the end face thereof remote from the saw blade into the path of a board being cut from a log by the saw blade, said spring members having a restoring force exerted upon a fully cut board and said spring members being constructed to exert a maximum force to the upper part of a fully cut board whereby a fully cut board is horizontally moved and tipped away from the splitter blade and the saw blade.

7. A saw splitter and tipper assembly for use with a saw blade used for cutting boards from logs comprising a support member, a narrow bar mounted on said support member in generally parallel relation to the saw blade and adjacent said saw splitter, the uppermost edge of said narrow bar remote from said saw blade being in the path of fall of a freshly cut board, a vertically extending splitter blade mounted on said support member in alignment with the saw blade and in the path of the saw cut formed between a log and a board being cut therefrom, a spring member mounted on said splitter blade and extending from the end face thereof remote from the saw blade into the path of a board being cut from a log by the saw blade, said spring member having a restoring force exerted upon a fully cut board and said spring member being constructed and arranged to exert a force to the upper part of a fully cut board whereby a fully cut board is tipped away from the splitter blade and the saw blade.

8. In a saw splitter and tipper assembly of the type mounted in fixed relation to a saw blade used for cutting boards from logs, said tipper tipping freshly cut boards away from said saw blade, the improvement comprising abutment means mounted in fixed relation to the saw blade and adjacent the saw splitter, said abutment means having an edge generally parallel to the saw blade located in the path of fall of a freshly cut board, said edge providing a pivot over which the freshly cut boards fall away from the saw blade.

9. The improvement of claim 8 wherein said abutment means comprises an elongate, narrow bar mounted on a support member which supports said saw splitter, and wherein said edge is the uppermost edge of said bar most remote from said saw blade.

UNITED STATES PATENT OFFICE
CERTIFICATE OF CORRECTION

Patent No. 3,583,450          Dated June 8, 1971

Inventor(s) Robert J. Gunnerman

It is certified that error appears in the above-identified patent and that said Letters Patent are hereby corrected as shown below:

Column 1, line 5, for "lumber" read ---logs---.

Column 3, line 28, for "beings" read ---begins---.

Signed and sealed this 21st day of December 1971.

(SEAL)
Attest:

EDWARD M. FLETCHER, JR.          ROBERT GOTTSCHALK
Attesting Officer                Acting Commissioner of Patents